Figure 1:
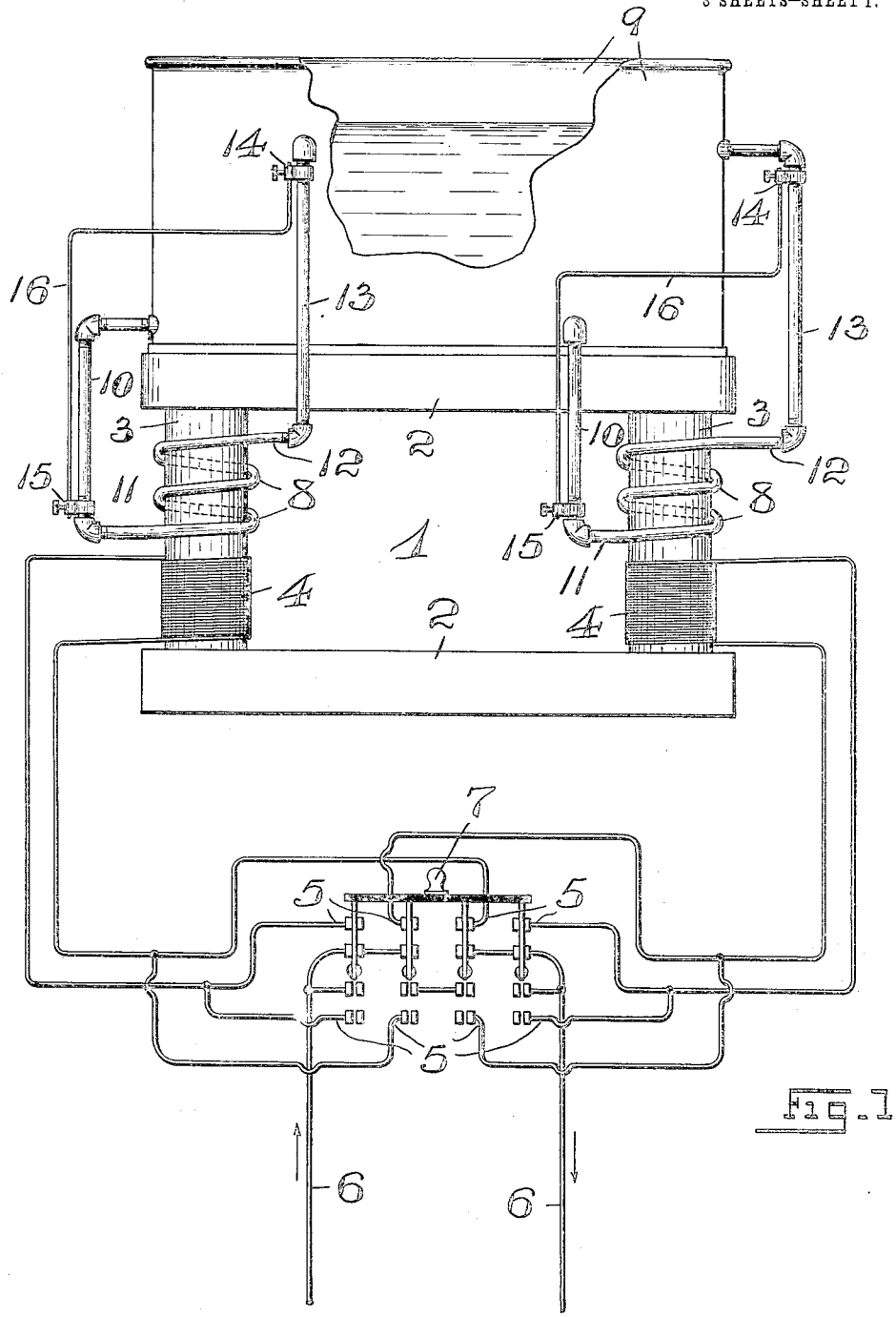

D. FARRAND.
ELECTRIC HEATING APPARATUS.
APPLICATION FILED MAR. 16, 1910.

1,122,892.

Patented Dec. 29, 1914.
3 SHEETS—SHEET 1.

WITNESSES:
Fredk. W. Fraentzel
Anna H. Alter

INVENTOR:
Dudley Farrand,
BY Fraentzel and Richards,
ATTORNEYS

D. FARRAND.
ELECTRIC HEATING APPARATUS.
APPLICATION FILED MAR. 16, 1910.

1,122,892.

Patented Dec. 29, 1914.
3 SHEETS—SHEET 2.

WITNESSES:
Fred'k W. Fraentzel
Anna H. Alter

INVENTOR:
Dudley Farrand,
BY
Fraentzel and Richards,
ATTORNEYS

D. FARRAND.
ELECTRIC HEATING APPARATUS.
APPLICATION FILED MAR. 16, 1910.

1,122,892.

Patented Dec. 29, 1914.
3 SHEETS—SHEET 3.

WITNESSES:
Fred'k H. W. Fraentzel
Anna H. Alter

INVENTOR:
Dudley Farrand,
BY Fraentzel and Richards,
ATTORNEYS

UNITED STATES PATENT OFFICE.

DUDLEY FARRAND, OF NEWARK, NEW JERSEY.

ELECTRIC HEATING APPARATUS.

1,122,892. Specification of Letters Patent. Patented Dec. 29, 1914.

Application filed March 16, 1910. Serial No. 549,691.

*To all whom it may concern:*

Be it known that I, DUDLEY FARRAND, a citizen of the United States, residing at Newark, in the county of Essex and State of New Jersey, have invented certain new and useful Improvements in Electric Heating Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in electric heating apparatus; and the invention relates, more particularly, to an apparatus for supplying hot-water for purposes of consumption, and also for supplying and circulating hot-water in the radiators of hot water heating systems, and for various other purposes to which the present invention is applicable.

The principal object of the present invention is to provide a simple and effective apparatus or appliance for making use of an electrical current to heat water for the purposes above set forth; and a further object of the present invention is to provide the magnetic fields of a transformer with primary and secondary windings, the primary windings being connected with a main circuit connected with a suitable source of electrical energy, while the secondary windings constitute tubular coils or pipes wound around the field-cores of the transformer, said secondary-windings thus being adapted to carry and circulate the water or other fluid to be heated, and thereby providing an exceedingly simple, and most efficient means for heating fluids by means of electricity.

A further object of the present invention is to provide in certain desired applications of said invention, a means for short-circuiting a portion of the piping leading to and forming a part of said secondary windings, thereby cooling a portion of said piping, to aid the circulation of the water or other fluid in the system.

Other objects of the present invention not at this time more particularly enumerated, will be clearly understood from the following detailed description of the said invention.

With these various objects of the present invention in view, the said invention consists, primarily, in the novel electrical heating device or apparatus hereinafter more fully set forth; and, this invention consists, furthermore, in the novel arrangements and combinations of the various devices and parts, as well as in the details of the construction thereof, all of which will be hereinafter more fully described, and then finally embodied in the clauses of the claim which are appended to and which form an essential part of this specification.

The invention is clearly illustrated in the accompanying drawings, in which:—

Figure 2:
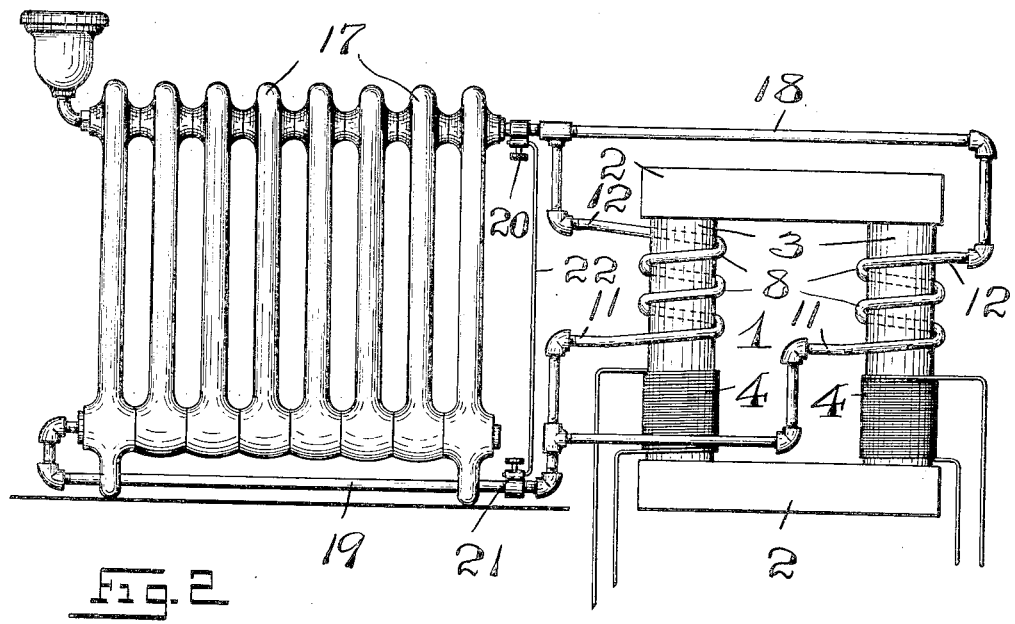
Figure 3:
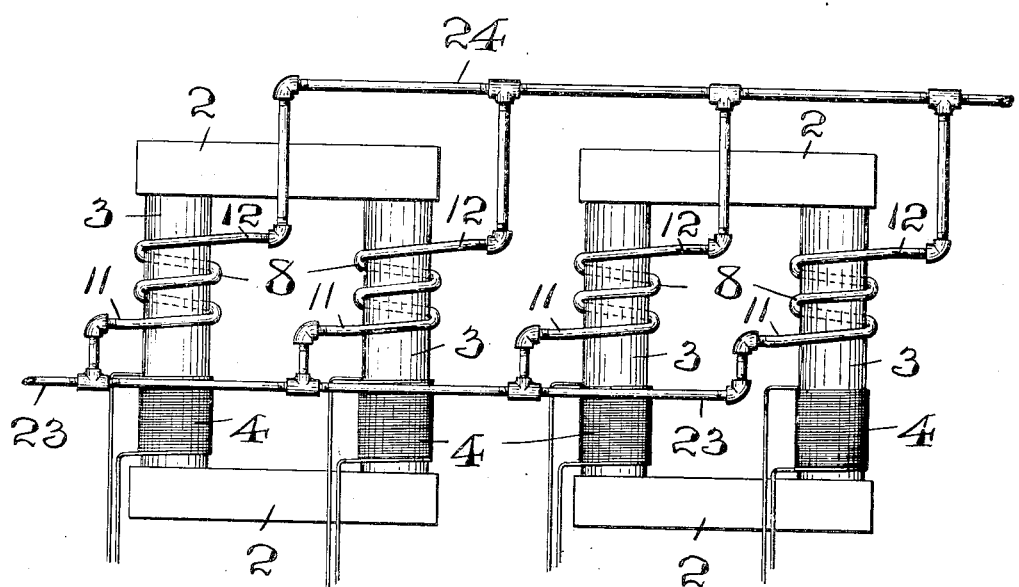
Figure 4:
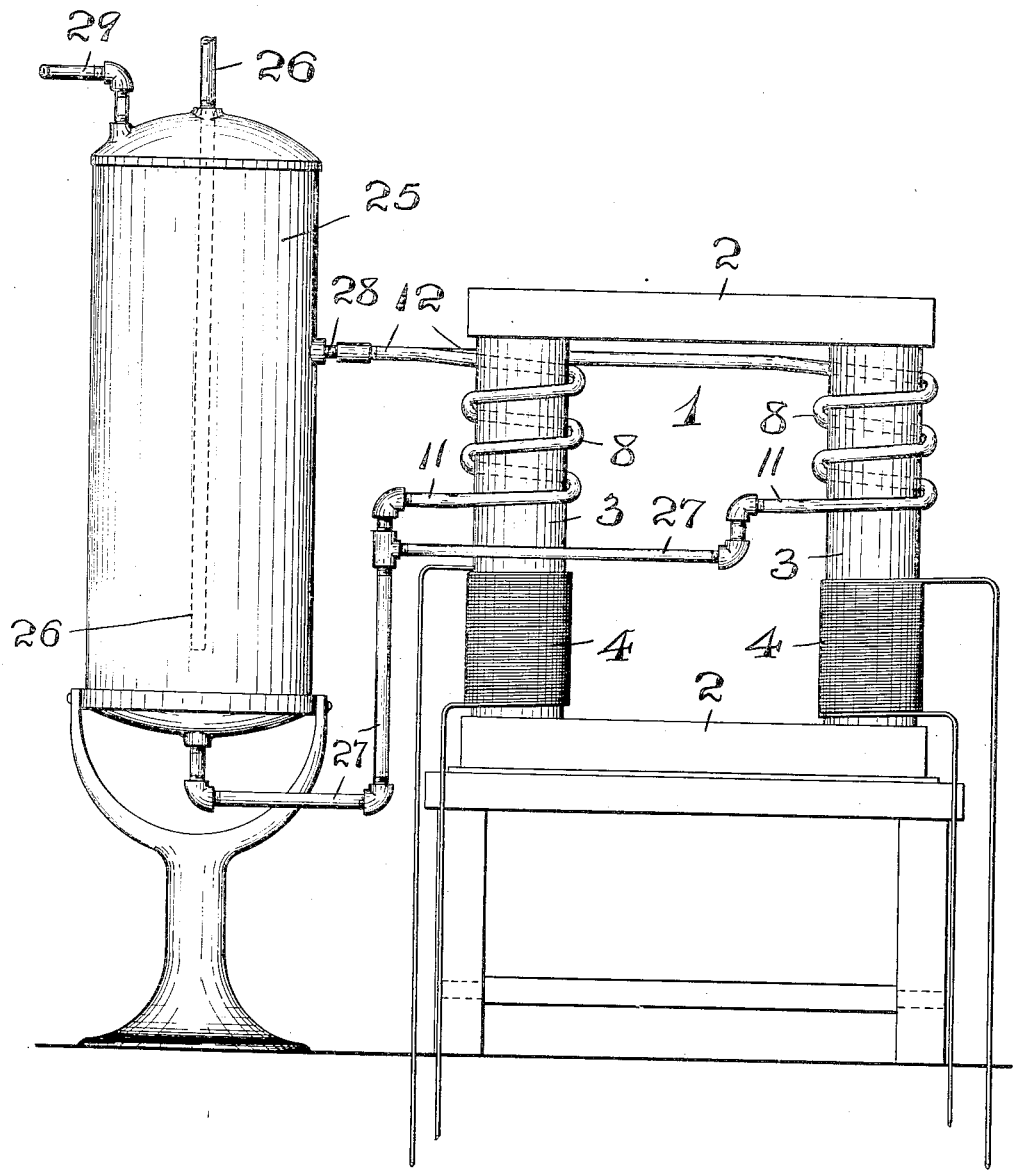

Figure 1 is a side elevation of an electrical fluid or water-heating apparatus, illustrating one embodiment of the present invention, and showing the apparatus in the form of a tank supported upon a transformer, with the primary and secondary circuits arranged in the manner of the present invention. Fig. 2 is an elevation of an electric water-heating apparatus made according to the invention, and showing the application of the same to a radiator, such as are ordinarily used in heating plants for buildings of the various kinds. Fig. 3 is an elevation of an electrical water-heating apparatus, showing another embodiment of the invention, the apparatus comprising a multiplicity of primary and secondary coils, the tubular secondary coils being connected to a single line of piping. Fig. 4 is an elevation of an electrical water-heating apparatus showing the application of the same to a boiler or tank for supplying hot-water for domestic use.

Similar characters of reference are employed in all of the herein-above described views, to indicate corresponding parts.

Referring now to the said drawings, the reference-character 1 indicates an electrical water or fluid-heating apparatus showing one embodiment of the principles of the present invention, and the same comprises a suitably formed transformer having the usual field-pieces 2, between which are arranged the energizing cores 3. Each core 3 is provided with suitable wire-windings, each winding consisting of a primary winding or coil 4. These windings are arranged so as to coil upon, or encircle, both cores 3 in the same direction, in the usual and well-known manner. The terminals 5 of said primary windings or coils 4 are electrically connected with the wires or electrical conductors 6 of a main feed-circuit, leading from any suitable source of electrical energy, electrical connection being made by means of any suitable electrical switch, as 7, and which is illustrated diagrammatically in Fig. 1 of the drawings. This switch may be of any suitable construction and may operate in such a manner, that the primary windings or coils 4 of the respective energizing cores 3 may be coupled with a main source of electrical energy, either in parallel or in series, as may be desired.

Referring more particularly to Fig. 1 of the said drawings, the novel heating apparatus is shown in operative connection with an ordinary tank 9, adapted to contain a fluid, such as water. The said tank 9 is preferably arranged above and supported upon the transformer hereinbefore described. Pipes 10 lead from the bottom of said tank 9 to the lower or inlet-end 11 of each of said coils of piping 8, which form the secondary windings of said cores 3. In like manner, the upper or outlet-end 12 of each of said coils of piping 8 is connected with said tank 9 near the top or upper portion thereof, by means of pipes 13 which carry the water or other fluid to the top of said tank 9.

The fluid within the tank 9 passes down through the pipes 10, and in seeking its level in said tank 9, fills the said coils of piping 8, which form the secondary windings, and rises to the water-level of the tank 9 through the pipes 13. The secondary electric current, which is generated in the coil of piping 8 through the agency of the primary windings on said energizing cores 3, heats up said coils of piping 8, and consequently also heats the water or other fluid contained in said coils of piping 8. The heated water naturally rises in said coils of piping 8 and said pipes 13, thus flowing back into the tank 9, the cold water flowing from the bottom of said tank 9, through the pipes 10, replacing the heated water in said coils of piping 8, and thus establishing a circulation of the water to be heated through said coils of piping 8. In order to assure a more perfect circulation of the said water by keeping the feed-pipes 10 at a lower temperature and preventing the same from heating, and to further prevent any tendency of the water to rise in said pipes 10, there may be provided a by-pass wiring or short circuit which serves to cut-out of the secondary circuit of said cores 3, the said pipes 10. This by-pass wiring or short circuit comprises a suitable binding post 14, or other suitable means of fastening secured upon a portion, preferably the upper end of each pipe 13, and a similar binding-post 15, or other suitable means of fastening upon a portion and preferably the lower end of each pipe 10, said binding-posts being respectively connected by means of circuit-wire 16. The electrical current generated in the secondary windings or coils of piping 8 flows into the pipes 13, and back to the coils of piping 8, through said wire-conductors 16, thus short-circuiting out of the said secondary circuit the pipes 10, so that the same remain at a lower temperature than the coils of piping 8 and the return pipes 13, and thereby permitting the cold water or fluid in said tank 9 to pass freely through the pipes or to the coils of piping 8, there to be heated.

Referring now to Fig. 2 of the said drawings, the novel heating apparatus is shown in its operative connection with a hot-water radiator 17. The feed-pipe 18 is connected with the outlet or upper ends 12 of the coils of piping 8 and said pipe leads into the upper portion of said radiator 17. The return-pipe 19 of the radiator is connected with the inlet or lower ends 11 of said coils of piping 8, substantially in the manner shown. In order to assure a proper circulation of the water through said radiator 17 and the return-pipe 19, to said coils of piping 8, the said radiator 17 and a portion of said return-pipe is cut out of the secondary circuit, formed by said coils of pipe 8, by means of a by-pass wiring or short circuit which comprises a binding-post 20, or other means of fastening upon the feed-pipe 18, in any convenient location, and a similar binding-post 21, or other means of fastening connected in a convenient location to the return pipe 19, the said binding posts being connected by the circuit-wire 22, thus cutting out of the secondary circuit the radiator 17 and a greater portion of the return-piping 19, so that the same remain at a lower temperature than the coils of piping 8 and feed-piping 18, whereby a free circulation of the cool water is permitted back to said heating coils of piping 8. The operation of the heating apparatus is substantially as above described in connection with the tank 9.

Referring now to Fig. 3 of the said drawings, the novel heating apparatus is shown in operative connection with a running or straight line of piping. When such an application of my novel heating apparatus is made, it will be readily understood that a plurality of heating units may be arranged in circuit and connected with the line of piping. The inlet-line of piping 23 is connected with the lower or inlet ends of any number of coils of piping 8 which form the secondaries of the said cores 3, of each leading unit, the upper or outlet ends of said coils of piping 8 being connected with the outlet-line of piping 24. The water passing through said lines of piping 23 and 24 is conveyed through said coils of piping 8, whereupon the same is heated during its transit, as will be clearly understood.

Referring now to Fig. 4 of said drawings, the novel electrical heating apparatus is shown in its arrangement with a boiler 25 which is adapted to contain water to be heated for domestic uses. In such application, the usual cold water feed-pipe 26 enters said boiler 25 in the usual manner, and a system of piping 27 is connected with the bottom of said boiler 25 and extends to and is connected with the bottom or inlet-ends 11 of said coils of piping 8 forming the secondary circuit of the cores 3 of said heating apparatus. The outlet ends 12 of said coils of pipes 8 are connected by means of piping 28 to the boiler and by means of which the heated water is returned to the boiler 25. The hot water is drawn off from the top of said boiler 25 by the usual outlet pipe 29.

From the foregoing description, it will be clearly evident, that I have devised a novel, simple and efficient apparatus for electrically heating fluids, as water, and the like, said apparatus being adapted to be applied to many uses to which it is desirable to put the same for the purpose of heating water or other liquids; but, it will be readily understood that some changes may be made in the general arrangements and combinations of the various devices and parts, as well as in the details of the construction of the same, without in any way departing from the scope of the present invention, as set forth in the foregoing specification, and as defined in the claim which is appended thereto. Hence, I do not limit my present invention to the exact arrangements and combinations of devices and parts as described in the said specification, nor do I confine myself to the exact details of the construction of the said parts as illustrated in the accompanying drawings.

I claim:

An apparatus for heating fluids by means of electricity comprising a transformer having field cores, wire-conductors arranged upon and encircling said field cores, said wire-conductors forming primary windings, said wire-conductors being connected in circuit with a source of electrical energy, a fluid-containing means, and an outlet-pipe and a return-pipe connected with said fluid-containing means, tubular fluid-conveying ducts connected with said outlet and return-pipes, said fluid-conveying ducts encircling said field cores and forming secondary windings, and wire-conductors between said outlet-pipes and return-pipes for short-circuiting the outlet-pipes out of said secondary circuit, so that the outlet pipes will remain at a lower temperature than the secondary coil and the return-pipe.

In testimony, that I claim the invention set forth above I have hereunto set my hand this 14th day of March, 1910.

DUDLEY FARRAND.

Witnesses:
FREDK. C. FRAENTZEL,
FREDK. H. W. FRAENTZEL.